United States Patent [19]

Johnson

[11] 4,329,140
[45] May 11, 1982

[54] MULTIPLE FLASH ARRANGEMENT WITH REDUNDANT FUSE ARRANGEMENT

[75] Inventor: Bruce K. Johnson, Andover, Mass.

[73] Assignee: Polaroid Corporation, Cambridge, Mass.

[21] Appl. No.: 206,745

[22] Filed: Nov. 14, 1980

Related U.S. Application Data

[63] Continuation of Ser. No. 58,855, Jul. 19, 1979.

[51] Int. Cl.³ .................................................. G03B 15/02
[52] U.S. Cl. ..................................... 431/359; 362/13; 362/15
[58] Field of Search ..................... 431/359; 362/11, 13, 362/15; 354/141

[56] References Cited

U.S. PATENT DOCUMENTS

| | | | |
|---|---|---|---|
| 3,458,270 | 7/1969 | Ganser et al. | 431/359 |
| 3,459,487 | 8/1969 | Glenn | 431/359 |
| 3,473,880 | 10/1969 | Wick | 362/13 |
| 3,532,931 | 10/1970 | Cote | 431/359 |
| 3,562,508 | 2/1971 | Hoffacker | 431/359 |
| 3,598,511 | 8/1971 | Ohmae et al. | 431/359 |
| 3,666,394 | 5/1972 | Bok et al. | 431/359 |
| 3,668,421 | 6/1972 | Bowers, Jr. | 362/13 |
| 3,692,995 | 9/1972 | Wagner | 362/13 |
| 3,728,068 | 4/1973 | Cote | 431/359 |
| 4,017,728 | 4/1977 | Audesse et al. | 362/13 |
| 4,048,487 | 9/1977 | Kewley | 362/13 |
| 4,064,431 | 12/1977 | Cote | 362/13 |
| 4,087,849 | 5/1978 | Colville et al. | 362/13 |
| 4,133,631 | 1/1979 | Collins et al. | 431/359 |
| 4,158,879 | 6/1979 | Peterson | 362/13 |

*Primary Examiner*—Samuel Scott
*Assistant Examiner*—Lee E. Barrett
*Attorney, Agent, or Firm*—Edward S. Roman

[57] ABSTRACT

A multi-flash lamp array includes a plurality of flash lamps interconnected in pairs so that the second flash lamp of each pair is fusably connected to fire during the next exposure in response to the firing of the first flash lamp of that pair. If the first flash lamp of the pair should fail to fire and thereby fail to fusably connect the second flash lamp of the pair, there is provided a redundant fusing arrangement whereby the second flash lamp of the pair is subsequently fused in connection to fire during the next exposure in response to the firing of the first flash lamp in the next succeeding pair of flash lamps to be fired.

4 Claims, 1 Drawing Figure

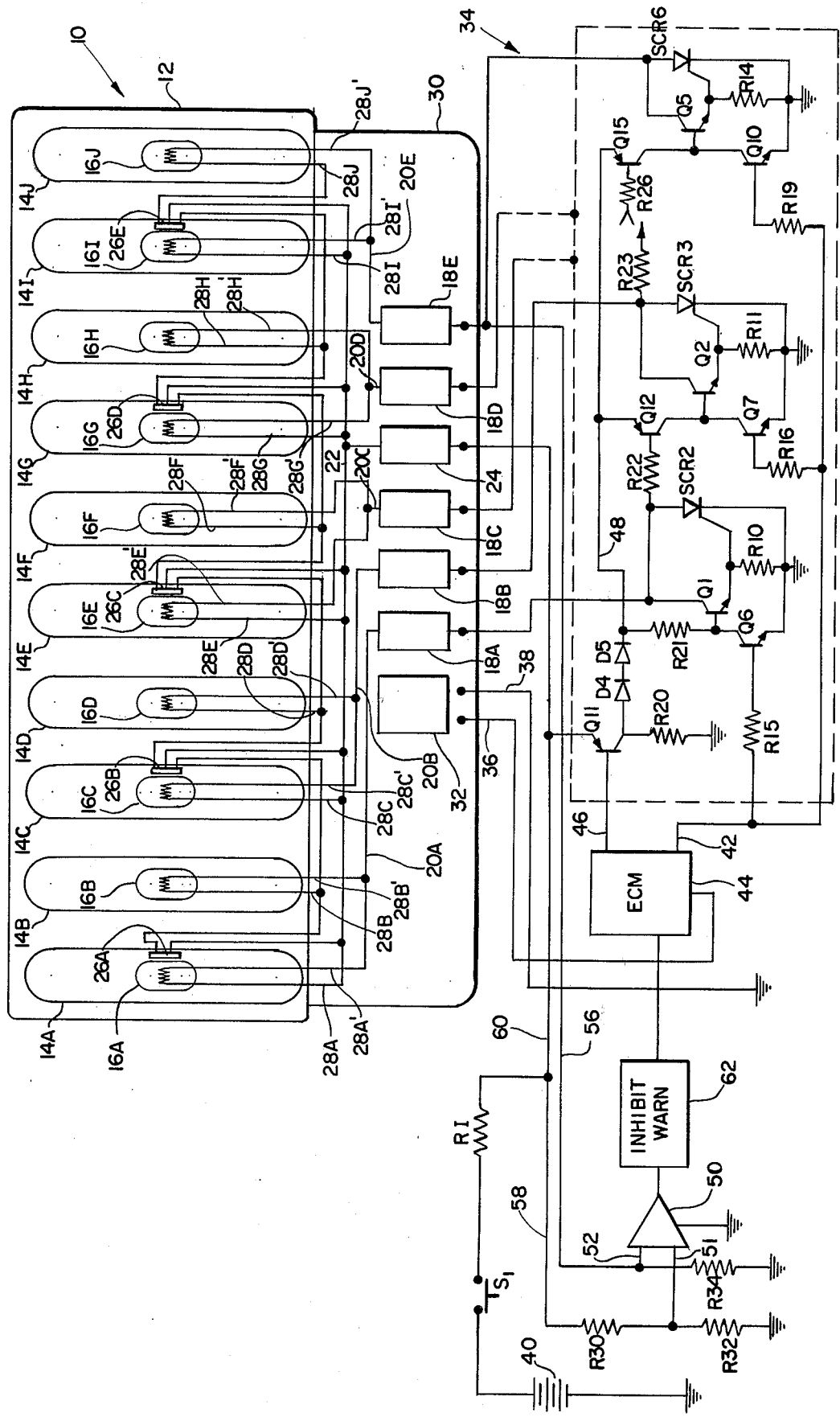

MULTIPLE FLASH ARRANGEMENT WITH REDUNDANT FUSE ARRANGEMENT

This is a continuation of application Ser. No. 58,855 filed July 19, 1979.

BACKGROUND OF THE INVENTION

1. Field of the Invention

This invention relates generally to a multi-flash lamp array with a redundant fuse arrangement and, more particularly, to a multi-flash lamp array comprising a plurality of flash lamp pairs sequentially fused in a manner operating to fire the second flash lamp of each flash lamp pair subsequent to the firing of the first flash lamp of the pair together with a redundant fuse arrangement operating to sequentially fire a second flash lamp in the immediately preceding flash lamp pair in the event that the first flash lamp in the immediately preceding pair of flash lamps failed to fire.

2. Description of the Prior Art

Both the Polaroid SX-70 Land camera and Pronto! camera, made and sold by the Polaroid Corporation of Cambridge, Mass., U.S.A., are adapted to make photographs automatically either by ambient light or with the aid of a flash lamp array. For this purpose, the camera is provided with an accessory socket in the shutter and lens housing which will accept a connector blade from a multi-flash lamp array. The flash lamp array includes five flash lamps arranged in one side of the array and five flash lamps arranged in the other side of the array so that five sequential exposures can be made, each with a different bulb, when the array is inserted in the socket in either position. The remaining five lamps can be sequentially used by removing the flash array, and putting it back in facing the opposite direction.

The camera is provided with a flash fire sequencing circuit to select the next unfired bulb for energizing each successive photographic exposure cycle. Since the flash fire sequencing circuit need only be capable of sequentially firing five flash lamps in a row, it is provided with five flash fire control circuits in correspondence with the five flash lamps in either side of the multi-flash lamp array.

Since the aforementioned multi-flash lamp array must be withdrawn from the camera socket, turned around and reinserted subsequent to the firing of five flash lamps, it may be desirable to provide all ten of the flash lamps on one side of the flash lamp array in order to eliminate the inconvenience of having to remove and reinsert the flash array when half of the bulbs are expended. However, such a rearrangement of the individual flash bulbs for the linear flash array might necessitate a redesign to the flash fire sequencing circuit to provide additional flash firing circuits to accommodate the additional flash lamps on one side of the flash array. Such a redesign would be expensive and costly and would not permit the use of the new ten flash lamp arrays with older cameras having only five flash fire circuits. Therefore, it is desirable to maintain the original flash firing sequencing circuit with its attendant five flash fire control circuits and to adapt a new ten flash lamp array to be sequentially fired from the original five flash fire control circuits.

Therefore, it is a primary object of this invention to provide a multi-flash lamp array wherein the flash lamps are connected to be sequentially fired in pairs with a redundant fusing arrangement provided to guarantee the firing of the second flash lamp in each pair in the event that the first flash lamp of that pair is defective and thereby fails to fire.

It is a further object of this invention to provide a new multiple flash lamp array wherein the flash lamps are fusably connected in pairs in a manner whereby the ignition of the first flash lamp of each pair operates by way of an ignition responsive switch or fuse to connect the second flash lamp in that pair as well as the second flash lamp in the immediately preceding pair to the flash fire circuit so as to enable the subsequent firing of the second flash lamp in the immediately preceding pair of flash lamps during the next exposure cycle in the event that the first lamp in the immediately preceding flash lamp pair was not fired during the preceding exposure cycle.

Other objects of the invention will in part be obvious and will in part appear hereinafter. The invention accordingly comprises the mechanism and system possessing the construction, the combination of elements and the arrangement of parts which are exemplified in the following and detailed disclosure.

SUMMARY OF THE INVENTION

This invention relates to a multi-lamp photoflash array for use with a camera of the type having means for providing a flash fire signal at one of a plurality of flash fire terminals wherein the flash fire signal is normally sequentially advanced from one terminal to another in correspondence with each exposure cycle. The multi-lamp photo flash array comprises a variety of flash lamps together with connector means for receiving the flash fire signal from the camera flash fire signal means and for directing the flash fire signal from each flash fire terminal to a select pair of the plurality of flash lamps. The connector comprises a plurality of spaced apart terminal elements arranged for complimentary connection with respect to the camera flash fire terminals and a plurality of conductive leads for interconnecting each of the photoflash terminal elements with a respective one of the pairs of flash lamps. A common lead is provided to connect all the flash lamps back to another terminal element. The common lead connects directly to a first one of all the lamps in each of the pairs of flash lamps. Switch means are provided which respond to the firing of each of the first one of the flash lamps in each of the flash lamp pairs for connecting to the common lead, the second one of the flash lamps in each of the flash lamp pairs and the second one of the flash lamps in the immediately preceding flash lamp pair in the flash fire sequence so as to enable the subsequent firing of the second one of the flash lamps in the preceding pair of flash lamps during the next exposure cycle in the event that the first one of the flash lamps in the preceding flash lamp pair did not fire during the preceding exposure cycle.

DESCRIPTION OF THE DRAWING

The novel features that are considered characteristic of the invention are set forth with particularity in the appended claims. The invention itself, however, both as to its organization and its method of operation, together with other objects and advantages, thereof, will be best understood from the following description of the illustrated embodiment or when read in connection with the accompanying drawing.

The drawing is a schematic circuit diagram for the multi-flash lamp array of this invention and an associated camera flash fire sequencing circuit.

DESCRIPTION OF THE PREFERRED EMBODIMENT

Referring to the drawing, there is shown generally at 10 the multi-flash lamp array of this invention which may comprise an insulating block or support section 12 supporting ten reflectors 14A-14J comprising reflective recesses in which each of a series of ten flash lamps 16A-16J is mounted. Each of the flash lamps 16A-16J includes a pair of leads extending therefrom as shown at 28A-28J and 28A'-28J', respectively.

The flash lamps 16A-16J are connected in respective pairs with one lead, 28A', 28C', 28E', 28G' and 28I' from the first flash lamp of each flash lamp pair being in common connection with a respective lead 28B', 28D', 28F', 28H' and 28J' from the second flash lamp in each flash lamp pair. The flash lamp array 10 also includes a connector blade 30 depending downwardly from the insulating support section 12 and including a plurality of spaced apart terminal elements or conductive strips 24, 32, and 18A-18E. Each of the terminal elements 18A-18E connects, respectively, to the commonly connected leads from each flash lamp pair by the conductors 20A-20E.

A common terminal element is provided at 24 and interconnects the other leads 28A, 28C, 28E, 28G, and 28I from the first bulb of each respective pair of bulbs by way of a common conductor 22.

A plurality of flash actuated switches or fuses 26A-26E are stationed, respectively, in close spaced apart relation with respect to the first flash lamps 16A, 16C, 16E, 16G and 16I of each flash lamp pair. The flash actuated switches 26A-26E may each comprise a heat responsive switch having a pair of electrical contacts urged into contact with each other but held apart by a chemical or plastic material which melts or otherwise deforms when heated by the heat generated when an associated lamp flashes so as to permit the contacts to close and electrically short the switch. Alternatively, the heat responsive material may be a chemical or a composition bridged between or encapsulating a pair of spaced apart terminals which is normally an insulator which becomes electrically conductive when heated by the associated flashing lamp thereby forming an electrical connection between ther terminals. Alternatively, the flash actuated switches 26A-26E may comprise light actuated switches of the type described in U.S. Pat. No. 3,728,068, entitled "Photoflash Array Having Flash Actuated Switches", by Paul Cote, issued Apr. 17, 1973. Thus, the flash actuated switches 28A-28E may be of any conventional type switch which is normally non-conductive and which responds to the ignition of the respective flash lamp by becoming conductive.

The first flash actuated switch 26A operates to connect the lead 28B from the second flash lamp 16B of the first pair of flash lamps to the common conductor 22. The second flash actuated switch 26B operates to connect the lead 28D from the second flash lamp 16D of the second pair of flash lamps to the common line 22. In addition, the flash actuated switch 26B also operates to connect the lead 28B from the second flash lamp 16B of the first pair of flash lamps to the common line 22 for reasons which will become apparent from the following discussion. In like manner, the flash actuated switch 26C operates to connect the other lead 28F from the second flash lamp 16F of the third pair of flash lamps to the common lead 22 while simultaneously connecting the other lead 28D from the second flash lamp 16D of the second pair of flash lamps to the common line 22. The remaining flash actuated switches 26D-26E operate in like manner to simultaneously connect the other lead from the second flash lamp of the same pair of flash lamps along with the other lead from the second flash lamp in the immediately preceding pair of flash lamps to the common line 22.

The connector blade 30 may be inserted in a well-known manner into the receiving socket of either an SX-70 or Pronto! type camera, both of which are manufactured and sold by Polaroid Corporation, to connect with corresponding conductors from a typical flash fire sequencing circuit as shown generally at 34 which is disposed within the camera. The terminal element 32 on the connector blade 30 is relatively wide so as to bridge a pair of conductors 36 and 38 in the flash sequencing circuit 34 thereby signaling the flash sequencing circuit that the flash lamp array 10 is in position in the camera and ready to be used.

The camera flash sequencing circuit 34 comprises five electronic switches, herein shown as an ordered array of silicon control rectifiers SCR2-SCR6. Of these, only the first silicon controlled rectifier SCR2 in the sequence, the second SCR3, and the last SCR6, are shown. The stage comprising the switch SCR3 is typical of the storage stages comprising the rectifier SCR4 and SCR5, not shown.

The anode terminals of the silicon controlled rectifiers SCR2-SCR6 connect, respectfully, to the terminal elements 18A-18E when the flash lamp array 10 is received in the corresponding camera socket. As is readily apparent, all the cathode terminals from the silicon controlled rectifiers SCR2-SCR6 connect to ground. Each of the gates of the controlled rectifiers SCR2-SCR6 connect to ground through a different one of a set of resistors R10-R14 of which only the resistors R10, R11 and R14 are shown. Each of the controlled rectifiers SCR2-SCR6 has its anode connected to the collector of a different one of a set of five gate control NPN transistors Q1-Q5. The emitter of each of the transistors Q1-Q5 is connected to the gate of a different one of the controlled rectifiers SCR2-SCR6. The base of each of the transistors Q1-Q5 is connected to the collector of a different one of a set of five inhibit NPN transistors Q6-Q10. The emitter of each of the transistors Q6-Q10 is grounded with respect to a battery 40 which may be included in the camera in a well-known manner. The base terminals of transistors Q6-Q10 are each connected through a different one of a series of current distributing resistors R15-R19 to an output terminal 42 from an electronic control module 44. When the electronic control module 44 provides a positive voltage signal corresponding to a logic 1 at output terminal line 42, each of the transistors Q6-Q10 is gated into conduction thereby preventing any of the transistors Q1-Q5 from being biased into conduction. The electronic control module 44 also provides a trigger signal at output terminal line 46 to the base of a PNP transistor Q11. The emitter terminal of transistor Q11 is connected to the positive voltage side of the battery 40 by way of a resistor R1 and a photographic cycle actuator button S1. Thus, the emitter terminal of transistor Q11 receives a positive potential from the battery 40 when the button S1 is depressed. The collector of transistor Q11 is returned to ground through a resistor R20. The collector of transistor Q11 also connects to a lead 48 through a pair of diodes D4 and D5 in series.

The lead 48 is connected to the base terminal of the transistor Q1 through a resistor R21. The lead 48 is also connected to the emitters of a group of four logic PNP transistors Q12–Q15, of which only the transistors Q12 and Q15 are shown. The collectors of the transistors Q12–Q15 are connected to the bases of the transistors Q2–Q5, respectively.

The base of the transistor Q12 is connected to the anode of the controlled rectifier SCR2 through a resistor R22. A similar resistor R23 connects the anode of the controlled rectifier SCR3 to the next stage transistor Q13, not shown. Other stages are similarly connected, e.g., the base of the transistor Q15 is connected to one terminal of a resistor R26, and the other terminal of the resistor R26 is connected to the anode of the controlled rectifier SCR5, not shown.

The flash sequencing circuit 34 is designed to fire each flash lamp in a select sequence advancing from first to last. This is accomplished by having each switching circuit receive a trigger signal only when the preceding flash lamp is open circuited. Assuming now that none of the flash lamps have been fired and that the flash sequencing circuit 34 is triggered at the appropriate time by the electronic control module 44, which appropriate time is generally programmed to occur when the shutter is fully open in response to depression of the actuator button S1 as is fully disclosed in U.S. Pat. Nos. 3,930,184, entitled "Electronic Flash Coupling System for Sequential Flash Bulb Firing Circuit", by C. Biber, issued Dec. 30, 1975; and U.S. Pat. No. 3,820,128, entitled "Flash Photographic Control System", by J. Burgarella et al., issued June 25, 1974. The appropriate trigger signal from the electronic module 44 provides a zero or negative potential signal at output line 42 so as to maintain the inhibit transistors Q6–Q10 in a non-conducting state while a negative going pulse is provided by the output terminal line 46 to gate transistor Q11 into conduction. Turning on transistor Q11 operates to render gate control transistor Q1 conductive so as to switch on SCR2 thereby effectively coupling the first lamp 16A across the battery 40 supply voltage so as to fire the lamp. As the lamp 16A is initially supplied with current and begins to flash, SCR3 will not turn on because its gate control transistor Q2 remains in a non-conductive state. The latter falls from the fact that its associated logic transistor Q12 is not rendered conductive. That is, the voltage across the emitter base junction of the transistor Q12 is substantially identical to the voltage across the flashing lamp 16A and the latter voltage is low in as much as the initial filament resistance is also very low. As should be readily appreciated, however, as the lamp filament heats up, its resistance increases (just prior to opening of the filament) and the voltage across the lamp will accordingly increase. However, the electronic control module 44 operates to turn on inhibit transistors Q6–Q10 so that subsequent circuits cannot turn on at this latter time during flashing of a preceding lamp. Thus, once the firing of a particular bulb is initiated, a high level in each signal is provided from the flash sequencing circuit for feedback through the electronic control module 44 so that the distributor circuit 34 is clamped off so as to prevent additional lamp firing at that time as is more fully described in U.S. Pat. No. 3,930,184, supra.

As is readily apparent, firing the lamp 16A also operates to cause the switch 26A to close thereby connecting the lead 28B from the second flash lamp 16B of the first pair of flash lamps to the common lead 22. Thus, after the first flash lamp 16A of the pair is fired, second flash lamp 16B is connected in parallel relation with respect to the previously fired flash lamp 16A by the switch 26A such that during the next photographic exposure cycle, the SCR2 is triggered in the aforementioned manner to fire the second flash lamp 16B of the first pair of flash lamps. Following the firing of the first pair of flash lamps 16A and 16B, when a subsequent trigger signal is received from the electronic control module 62 during the third photographic exposure cycle, the first SCR2 will be in a conductive state and a voltage across the first pair of open lamps 16A and 16B will be high so that the voltage across the transistor Q12 will exceed the threshold voltage necessary to turn on this transistor. The latter, in turn, provides a suitable gating signal to the second SCR3 through gate transistor Q12 so as to draw ignition current through the first lamp 16C of the second pair of lamps. However, during the initiation of current through the lamp 16C, the following SCR's will not be turned on in as much as the transistor Q13 (not shown) is in parallel with the conducting line, and hence, is not biased for conduction.

The firing of the flash lamp 16C operates, in turn, to close the flash responsive switch 26B thereby connecting the other lead 28D from the second flash lamp 16D of the second flash lamp pair to the common line 22 while simultaneously connecting the other lead 28B from the second flash lamp 16B of the previously fired pair of flash lamps to the common terminal 22. Since lamp 16B may normally be expected to have been fired during the photographic cycle immediately preceding the firing of lamp 16C, the connection of lead 28B to the common lead 22 by way of the flash responsive switch 26B should have no effect on the order on which the flash lamps are to be fired. Therefore, the fourth photographic cycle would normally operate to effect the firing of lamp 16D by way of the silicon controlled rectifier SCR3 in the aforementioned manner since the lamps 16A, 16B and 16C would have been already fired in the normal manner and, thus, open circuited.

In the event, however, that the first flash lamp 16A of the first flash lamp pair were defective and did not ignite, then the flash actuated switch 26A would also not be actuated to connect the other lead 28B from the second flash lamp 16B of the first pair of flash lamps to the common lead 22. Alternatively, the flash actuated switch 26A may be defective and thereby also fail to connect the other lead 28B in the foregoing manner even if the first flash lamp 16A is not defective. In either case, a subsequent exposure operation which would have otherwise operated to fire the second flash lamp 16B in the first flash lamp pair in the manner previously described will instead operate to fire the first flash lamp 16C in the second flash lamp pair. This would occur since the high impedance condition of the first pair of flash lamps 16A and 16B between terminals 18A and 24 presents a sufficiently high voltage across transistor Q12 so as to gate the SCR3 on and draw ignition current through the first flash lamp 16C of the second flash lamp pair. Therefore, even if the second flash lamp 16B of the first flash lamp pair were operative, it would nevertheless be forever bypassed and the photographer would not only lose the first defective flash lamp 16A, but also its associated second flash lamp 16B.

The flash actuated switch 26B, however, precludes the loss of flash lamp 16B by also operating to connect the lead 28B therefrom to the common line 22. In this manner, the flash lamp 16B is thereby connected across the terminals 18A and 24 upon the firing of the first flash lamp 16C of the second flash lamp pair regardless of whether the first flash lamp 16A of the first flash lamp pair actually fires or whether the switch 26A is defective or not. Thus, the photographic exposure cycle subsequent to that exposure cycle in which flash lamp 16C is fired would operate to fire the second flash lamp 16B of the first flash lamp pair since the low impedance provided across the terminals 18A and 24 would operate to preclude the gating on of transistor Q12. After the firing of the second flash lamp 16B of the first flash lamp pair, the next exposure cycle would operate in the aforementioned manner to provide an ignition current to the second flash lamp 16D of the second flash lamp pair since the first and second flash lamps 16A and 16B of the first flash lamp pair provide a high impedance that enables a high voltage across transistor Q12 so as to gate transistor Q12 on and thereby provide an ignition current by way of SCR3 through the second flash lamp 16D of the second flash lamp pair.

As is now readily apparent, each of the flash actuated switches 26B–26E provides a redundancy by operating to connect the other lead from the second flash lamp in the previous flash lamp pair to the common conductor 22. Thus, in this manner, should the first flash lamp of any flash lamp pair or its associated flash responsive switch be defective and thereby fail to actuate the associated flash responsive switch to connect the second flash lamp of that pair to the common line 22, then the first flash lamp in the next succeeding pair of flash lamps will operate to connect the second flash lamp of that pair to the common line 22 in order to enable the second flash lamp of the preceding pair to be fired during the next exposure cycle. Thus, if the first flash lamp or its associated flash responsive switch in any of the flash lamp pairs is defective other than the first flash lamp in the last pair of flash lamps, the second flash lamp in that pair will not be lost but instead will be subsequently fired as a result of the redundant feature of the flash actuated switches 26A–26D.

There may also be included a detector arrangement for examining the impedance of the last flash lamp 16J which is scheduled to be fired in the flash array 10 as is more fully described in U.S. Pat. No. 4,005,449, entitled "Flash Photographic System with Camera Inhibit Feature", issued Jan. 25, 1977. The detector arrangement 50 embodies a differential type operational amplifier 50 having a pair of input terminals 52 and 54. Input terminal 52 connects directly to the terminal strip 18E by way of an interconnecting line 56 and is also grounded by way of a resistor R34. Input terminal 51 connects to the junction between a pair of resistors R30 and R32. The other side of resistor R32 is grounded while the other side of resistor R30 connects to the terminal 24 by way of interconnecting lines 58 and 60. Since terminals 18E and 24 connect to the last flash lamp scheduled to be fired, the resistance value of resistor R30 is selected to correspond with the predetermined impedance evidenced by a fully expended flash lamp (at least 75 ohms). Resistors R32 and R34 are configured to have substantially the same resistive values so as to define a voltage dividing comparison network, the output of which at terminals 52 and 54 is amplified by the amplifier 50. It will be readily understood that the amplifier 50 is also coupled to the positive and negative terminals of battery 40 by means not shown. The output of amplifier 50, in turn, is connected to an inhibit and warn network 62 which may operate to provide both a warning signal to the user as well as an inhibit signal to the ECM 44 when the last flash lamp is expended. Thus, when a flash assembly with an operative last flash lamp is inserted within the socket, the output from the amplifier 50 may be considered "low" and the inhibit and warn network 62 allows normal operation of the ECM 44. When the resistance across the terminals 18E and 24 is high as happens when the last flash lamp is expended, then the output of amplifier 50 reverts to an opposite level, for instance "high" so as to inhibit further camera operations.

Since certain changes may be made in the above-described system and apparatus without departing from the scope of the invention herein involved, it is intended that all matter contained in the description thereof or shown in the accompanying drawing shall be interpreted as illustrative and not in a limiting sense.

What is claimed is:

1. A multi-lamp photoflash array for use with a camera of the type having means for providing a flash fire signal at one of a plurality of flash fire terminals wherein the flash fire signal is normally sequentially advanced from one terminal to another in correspondence with each exposure cycle, said flash array comprising:

a plurality of flash lamps;

connector means for receiving the flash fire signal from the camera flash fire signal means and for directing the flash fire signal from each flash fire terminal to a select pair of said plurality of flash lamps, said connector means comprising a plurality of spaced apart terminal elements arranged for complementary connection with respect to the camera flash fire terminals and a plurality of conductive leads for interconnecting respectively each of said photoflash terminal elements with a pair of flash lamps;

common means for providing a common connection from said photoflash array back to the camera, said common lead means comprising a common lead conductor and an other terminal with said common lead conductor connecting directly to a first one of said lamps in each of said pairs of flash lamps and to said other terminals; and switch means responsive to the firing of said first one of said flash lamps in each of said flash lamp pairs for connecting to said common lead means the second one of said flash lamps in said same flash lamp pair and the second one of said flash lamps in the immediately preceding flash lamp pair in said flash fire sequence so as to enable the subsequent firing of said second one of said flash lamps in said preceding pair of flash lamps during the next exposure cycle in the event that said first one of said flash lamps or its associated switch means in said preceding flash lamp pair did not operate during the preceding exposure cycle.

2. The photoflash array of claim 1 wherein: each flash lamp includes two leads extending therefrom, said connector means operates to connect one of said leads from each of said flash lamps with one of said leads from another of said flash lamps in each of said flash lamp pairs to form a pair of interconnected leads and to connect each of said pairs of interconnected leads with a respective one of said terminals, and said common lead means operates to connect all of the other leads from said first ones of said flash lamps in said flash lamp pairs to said other terminal.

3. The photoflash array of claim 2 wherein said switch means operates in response to the firing of said first one of said flash lamps in each of said flash lamp pairs to connect the other lead from said second one of said flash lamps in said same flash lamp pair to said common lead means while simultaneously connecting the other lead from said second one of said flash lamps in said immediately preceding flash lamp pair in said flash fire sequence to said common lead means.

4. The photoflash array of claim 1 wherein said plurality of flash lamps comprises ten flash lamps and said connector means comprises five terminal elements each connecting a respective pair of said flash lamps.

* * * * *